(12) United States Patent
Uemoto et al.

(10) Patent No.: US 11,199,844 B2
(45) Date of Patent: Dec. 14, 2021

(54) MANAGEMENT SYSTEM AND MANAGEMENT METHOD

(71) Applicant: Kubota Corporation, Osaka (JP)

(72) Inventors: Kensuke Uemoto, Sakai (JP); Katsuhiko Uemura, Sakai (JP); Nobuyuki Yoshii, Sakai (JP); Hideya Umemoto, Sakai (JP); Hitoshi Aoyama, Sakai (JP)

(73) Assignee: Kubota Corporation, Osaka (JP)

( * ) Notice: Subject to any disclaimer, the term of this patent is extended or adjusted under 35 U.S.C. 154(b) by 97 days.

(21) Appl. No.: 16/154,769

(22) Filed: Oct. 9, 2018

(65) Prior Publication Data

US 2019/0171216 A1 Jun. 6, 2019

(30) Foreign Application Priority Data

Dec. 5, 2017 (JP) .............................. JP2017-233298

(51) Int. Cl.
  *G05D 1/02* (2020.01)
  *G06Q 30/02* (2012.01)
  *G01C 21/34* (2006.01)
  *A01D 34/00* (2006.01)
  *B60L 53/00* (2019.01)

(52) U.S. Cl.
  CPC ......... *G05D 1/0219* (2013.01); *A01D 34/008* (2013.01); *G01C 21/3469* (2013.01); *G05D 1/0217* (2013.01); *G05D 1/0276* (2013.01); *G06Q 30/0283* (2013.01);

(Continued)

(58) Field of Classification Search
  CPC ........................... G05D 1/0219; A01D 34/008
  See application file for complete search history.

(56) References Cited

U.S. PATENT DOCUMENTS 8,565,984 B2 * 10/2013 Mayfield .............. A01B 69/008
  701/1
8,996,241 B2 * 3/2015 Uchida ................... B60L 50/16
  701/34.4

(Continued)

FOREIGN PATENT DOCUMENTS

JP   2010159113 A   7/2010
JP   2012105557 A   6/2012

(Continued)

*Primary Examiner* — Fadey S. Jabr
*Assistant Examiner* — Omar K Morsy
(74) *Attorney, Agent, or Firm* — The Webb Law Firm

(57) ABSTRACT

A management system for a work vehicle configured to carry out a utility work while traveling autonomously includes a work field information acquisition section for acquiring work field information indicative of information relating to a work field where the work is to be carried out, a route information acquisition section for acquiring route information indicative of a traveling route along which the vehicle has traveled, a consumed electric power information acquisition section for acquiring electric power information indicative of consumed electric power, a tilt angle information acquisition section for acquiring tilt angle information indicative of a tilt angle of the work field relative to the horizontal plane, and a calculation section for calculating a cost required for the work, based on the work field information, the route information, the electric power information and the tilt angle information.

10 Claims, 3 Drawing Sheets

(52) U.S. Cl.
CPC ........... *B60L 53/00* (2019.02); *B60L 2200/40* (2013.01); *G05D 1/0278* (2013.01); *G05D 2201/0208* (2013.01)

(56) References Cited

U.S. PATENT DOCUMENTS

| | | | |
|---|---|---|---|
| 9,521,806 B2 * | 12/2016 | Takahara | ................ A01B 76/00 |
| 9,615,501 B2 * | 4/2017 | Pickett | ................. A01D 41/141 |
| 2004/0068352 A1 | 4/2004 | Anderson | |
| 2006/0149465 A1 | 7/2006 | Park et al. | |
| 2009/0312948 A1 * | 12/2009 | Matthews | ............ G05D 1/0278 |
| | | | 701/472 |
| 2011/0246246 A1 * | 10/2011 | Johnson | ................. G06Q 50/14 |
| | | | 705/5 |
| 2012/0226407 A1 | 9/2012 | Noordam | |
| 2019/0216003 A1 * | 7/2019 | Green | .................. A01B 69/008 |
| 2019/0227561 A1 * | 7/2019 | Hiramatsu | ........... G05D 1/0219 |
| 2020/0205338 A1 * | 7/2020 | Zeiler | .................... B62D 21/11 |

FOREIGN PATENT DOCUMENTS

| | | | |
|---|---|---|---|
| JP | 2013164741 A | | 8/2013 |
| JP | 2014103932 A | | 6/2014 |
| JP | 2015191608 A | | 11/2015 |
| JP | 201628311 A | | 2/2016 |
| JP | 2017176116 A | | 10/2017 |
| WO | 2011062481 A1 | | 5/2011 |

* cited by examiner work field where work is carried out actually work field set via terminal actual position actual position GPS position information

MANAGEMENT SYSTEM AND MANAGEMENT METHOD

CROSS-REFERENCE TO RELATED APPLICATION

This application claims priority to Japanese Patent Application No. 2017-233298 filed Dec. 5, 2017, the disclosure of which is hereby incorporated in its entirety by reference.

TECHNICAL FIELD

The present invention relates to a management system and a management method for a work vehicle configured to carry out a utility work while traveling autonomously.

BACKGROUND ART

The convention has employed a technique of causing a vehicle to travel autonomously. As an example of such autonomous traveling vehicle, there is a work vehicle configured to effect unmanned traveling while carrying out a predetermined work (e.g. lawn cutting work) in a vast field. One kind of such technique is known from Patent Document 1 for example.

The unmanned traveling work vehicle disclosed in Patent Document 1 includes an electric motor mounted on a vehicle body and power-supplied from a battery and an engine mounted on the vehicle body. In operation, while the vehicle travels in a work area with wheels thereof being driven by the engine, the vehicle carries out a utility work with an implement mounted on the vehicle body being driven by the electric motor.

BACKGROUND ART DOCUMENT

Patent Document

Patent Document 1: Japanese Unexamined Patent Application Publication No. 2013-164741

SUMMARY

Problem to be Solved by Invention

Here, the work to be carried out by the work vehicle disclosed in Patent Document 1 can employ not only an unmanned traveling work vehicle owned by an individual, but by an unmanned traveling work vehicle owned by a contractor. And, in case the work is to be carried out by an unmanned traveling work vehicle owned by a contractor, there should occur payment and receipt of a certain service fee between the client and the contractor. However, the technique disclosed in Patent Document 1 does not contemplate the possibility of quantitative calculation of such service fee.

Thus, there is a need for a management system capable of quantitative calculation of a fee of a contracted service work.

Solution

According to a characterizing feature of a management system relating to one embodiment of the present invention, a management system for a work vehicle configured to carry out a utility work while traveling autonomously, comprises:

a work field information acquisition section for acquiring work field information indicative of information relating to a work field where the work is to be carried out;

a route information acquisition section for acquiring route information indicative of a traveling route along which the vehicle has traveled while carrying out the work in the work field;

a consumed electric power information acquisition section for acquiring electric power information indicative of consumed electric power required for the work of an amount of electric power stored in a battery mounted on the work vehicle;

a tilt angle information acquisition section for acquiring tilt angle information indicative of a tilt angle of the work field relative to the horizontal plane; and a calculation section for calculating a cost required for the work, based on the work field information, the route information, the electric power information and the tilt angle information.

According to a characterizing feature of a management method relating to one embodiment of the present invention, a management method for a work vehicle configured to carry out a utility work while traveling autonomously, comprises the steps of;

acquiring work field information indicative of information relating to a work field where the work is to be carried out;

acquiring route information indicative of a traveling route along which the vehicle has traveled while carrying out the work in the work field;

acquiring electric power information indicative of consumed electric power required for the work of an amount of electric power stored in a battery mounted on the work vehicle;

acquiring tilt angle information indicative of a tilt angle of the work field relative to the horizontal plane; and calculating a cost required for the work, based on the work field information, the route information, the electric power information and the tilt angle information.

With the above-described characterizing features, it becomes possible to quantitatively calculate cost of a contracted service work. Therefore, it becomes possible to verify reasonableness of the cost.

Preferably:

the work field information includes area information indicative of the area of the work field where the work is to be carried out;

the route information includes traveling distance information indicative of a traveling distance for which the work vehicle traveled during the work;

the calculation section and the calculating step of calculating the cost respectively calculates the cost, with using time information indicative of at least one selected from the group consisting of a working time required for the work, a charging time for charging the battery mounted on the vehicle, and a moving time of the work vehicle, the area information and the traveling distance information.

With the above-described arrangement, it becomes possible to calculate the cost of the contracted service work more accurately.

Preferably, the management system further comprises:

a computation section for computing a traveling route capable of reducing the cost of the work to be carried out in the work field, based on the work field information, the route information, the electric power information and the tilt angle information, relative to a traveling route traveled in the work field; and a traveling route storage section for storing the traveling route computed by the computation section.

Preferably, the management method further comprises the steps of:

computing a traveling route capable of reducing the cost of the work to be carried out in the work field, based on the work field information, the route information, the electric power information and the tilt angle information, relative to a traveling route traveled in the work field; and storing the computed traveling route.

With the above-described arrangement, it is possible to derive a traveling route optimal for the work. So, it is possible to reduce the work time; thus, the work can be carried out in an efficient manner Preferably, the work field is set by a user's operation on a map displayed on a display surface of a terminal owned by the user.

With the above-described arrangement, it becomes possible to set a work field easily. Accordingly, it becomes possible to reduce the trouble for the user. Further, as the work vehicle carries out a work field set by the user, it becomes possible to complete the work appropriately.

Preferably, the management system and the management method respectively further comprises a compensation section for compensating position information indicative of a position of a work field set on the map displayed on the display surface by position information indicative of an actual position of the work field.

With the above-described arrangement, even if a difference exits between the position information by the map displayed on the display surface and the actual position information, the position information can be compensated appropriately. Accordingly, it is possible to cause the work vehicle to grasp the work field appropriately, so that the work for the work field can be completed appropriately.

EMBODIMENTS

A management system relating to the present invention is configured to be capable of quantitatively calculating a cost of a contracted service work. This management system is a system for managing a work vehicle that carries out a utility work while traveling autonomously. In the following example, a grass (lawn) cutting work will be explained as such work to be carried out by this work vehicle. Here, the language "autonomous traveling" refers to traveling in which the vehicle travels along a traveling route set based on an output from a device mounted on the work vehicle (e.g. sensor output, captured images of a camera, etc.) while circumventing any object (e.g. an obstacle, etc.). Such work vehicle corresponds to a so-called autonomous robot.

Figure 1:
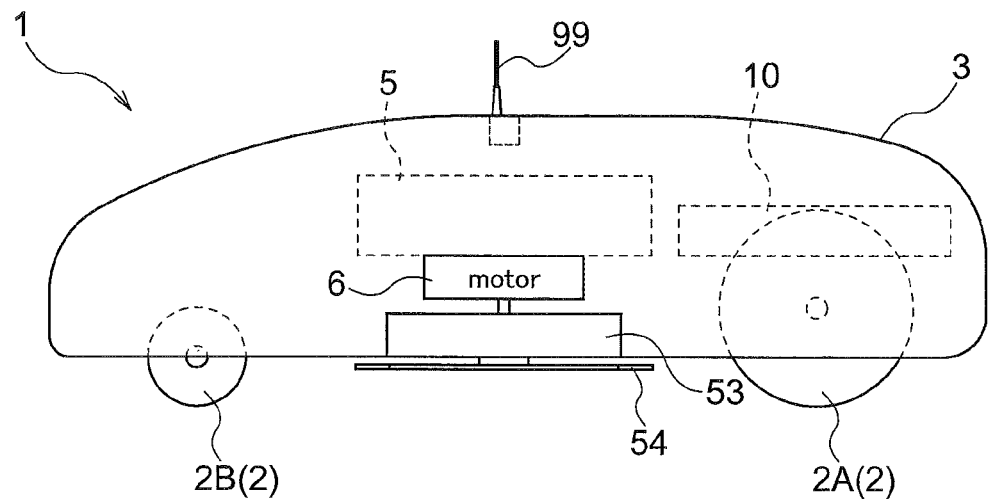
FIG. 1 is a side view of a work vehicle.
Figure 2:
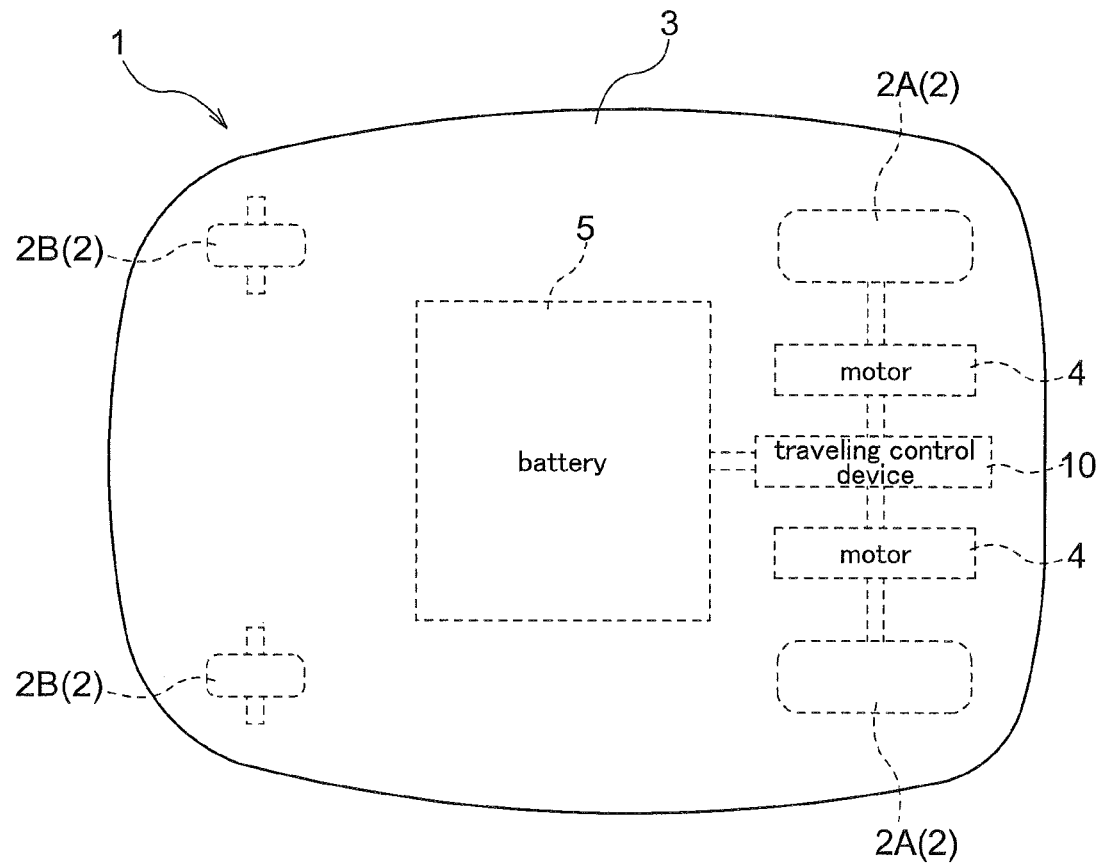
FIG. 2 is a plan view of the work vehicle.
Figure 3:
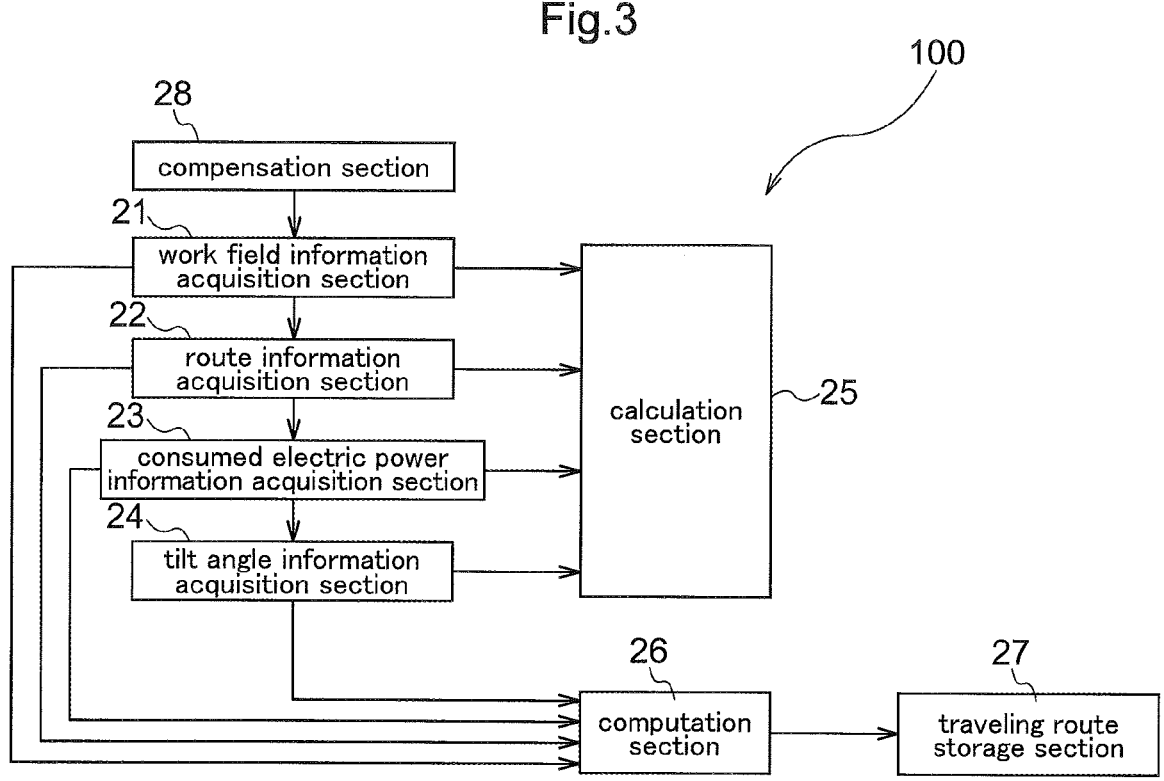
FIG. 3 is a block diagram schematically showing an arrangement of a management system.

FIG. 1 shows a side view of a work vehicle 1 managed by a management system 100 relating to this embodiment (see FIG. 3). FIG. 2 shows a plan view of the work vehicle 1. As shown in FIG. 1 and FIG. 2, the work vehicle 1 includes wheels 2 and a vehicle body 3. The wheels 2 consist of first wheels 2A (an example of driving wheel unit) mounted on one end side in the longitudinal direction of the vehicle body and second wheels 2B mounted on the other end side in the longitudinal direction of the vehicle body. The first wheels 2A and the second wheels 2B are provided respectively one left and right pair along the width direction of the vehicle body. In this embodiment, the first wheels 2A are provided as driving/steering wheels provided on the rear side in the advancing direction of the work vehicle 1 and driven by a traveling control device 10 which will be described later. The second wheels 2B are provided as so-called caster wheels provided on the front side in the advancing direction of the work vehicle 1. Accordingly, straight traveling is provided when the left and right wheels of the first wheels 2A are rotated at an equal speed in a same direction. When the left and right wheels of the first wheels 2A are rotated at different speeds in a same direction, steering is made to the slower side. Further, when the left and right wheels of the first wheels 2A are rotated at an equal speed but in different directions, the work vehicle 1 can spin at the present location. Incidentally, in the above, it was explained that the first wheels 2A and the second wheels 2B are provided respectively one left and right pair along the width direction of the vehicle body. However, this is only an example. Alternatively, it is also possible to arrange such that the respective numbers of the first wheels 2A and the second wheels 2B are made different from each other in accordance with the size of the vehicle body for instance. Or, only one or more than three respectively thereof can be provided.

The vehicle body 3 mounts thereon a pair of motors 4 as power source for the first wheels 2A, a battery 5 storing electric power to be supplied to the motors 4 and other electric devices included in the work vehicle 1, a traveling control device 10 for controlling traveling of the work vehicle 1, and a further motor 6 for driving a mower device 53 (an example of an "implement unit") having a cutter blade 54 for use in grass (lawn) cutting work.

Further, the vehicle body 3 mounts a GPS module 99 configured as a GNSS module. This GPS module 99 includes a GPS antenna for receiving GPS signals or GNSS signals (GPS signals in the instant embodiment). Incidentally, the GPS module 99 can include an inertial navigation module incorporating a gyro acceleration sensor, a geomagnetic direction sensor, etc. in order to assist the GPS navigation. Needless to say, the inertial navigation module can be provided at a site different from the GPS module 99. GPS signals acquired by the GPS module 99 will be utilized for the autonomous traveling of the work vehicle 1 described above or utilized as "GPS position information" by respective functional sections to be described later.

FIG. 3 is a block diagram schematically showing an arrangement of the management system 100 of this embodiment. The management system 100 includes, as functional sections, a work field information acquisition section 21, a route information acquisition section 22, a consumed electric power information acquisition section 23, a tilt angle information acquisition section 24, a calculation section 25, a computation section 26, a traveling route storage section 27 and a compensation section 28. These respective functional sections are built as hardware and/or software using a CPU as the core component thereof in order to allow the work vehicle 1 to carry out a utility work continuously.

The work field information acquisition section 21 acquires work field information indicative of information of a work field where a utility work is to be carried out. Here, "a work field where a utility work is to be carried out" means a work field where a grass cutting work is to be carried out, in this embodiment. The information of the work field means position information indicative of the position (location) of the work field or information indicative of a position of an object (e.g. an obstacle) present within the work field. The information indicative of the position of the work field comprises position information represented by latitude/longitude using GPS and allows also grasping of a length of the work field in a predetermined direction and an area thereof based on the latitude/longitude of corners of the work field. Such work field information includes area information of the work field where the grass cutting work is to be carried out and information indicative of the position of an obstacle present in the work field. The work field information acquisition section 21 acquires such work field information and transmits this to the calculation section 25 which will be described later.

The route information acquisition section 22 acquires route information indicative of a traveling route along which the work vehicle has traveled in the work field while carrying out the work therein. Here, a traveling route along which the work vehicle has traveled in the work field while carrying out the work therein is a traveling route along which the work vehicle 1 has effected autonomous traveling while carrying out a grass cutting work. Such traveling route can be represented by latitudes and longitudes using the GPS. Alternatively, such traveling route can be specified by using both latitudes and longitudes using the GPS and information from the traveling control device 10. Here, preferably, the route information includes traveling distance information indicative of a traveling distance over which the work vehicle 1 traveled during the work. The route information acquisition section 22 acquires such route information indicative of the actually traveled traveling route and/or traveling distance when the work vehicle 1 effected autonomous traveling while carrying out a grass cutting work. The route information acquired by the route information acquisition section 22 is transmitted to the calculation section 25 which will be described later.

The consumed electric power information acquisition section 23 acquires electric power information indicative of electric power required for the work of an amount of electric power stored in the battery 3 mounted on the work vehicle 1. The battery 5 mounted on the work vehicle 1 is used, as described above, for traveling of the work vehicle 1 and driving of the mower device 53. Thus, the consumed electric power required for the work corresponds to the electric power consumed for traveling of the work vehicle 1 and driving of the mower device 53. Therefore, the consumed electric power information acquisition section 23 acquires such electric power information indicative of electric power required for the work of the amount of electric power stored in the battery 3 mounted on the work vehicle 1. This electric power information is transmitted to the calculation section 25 which will be described later.

The tilt angle information acquisition section 24 acquires tilt angle information indicative of a tilt angle of the work field relative to the horizontal plane. Here, "a tilt angle of the work field relative to the horizontal plane" means an angle formed by the horizontal plane and the work field where the grass cutting work is to be carried out. This tilt angle corresponds to a tilt angle of the vehicle body of the work vehicle 1. Such tilt angle can be detected by a known tilt angle sensor. And, such tilt angle information allows for specification of a degree of difficulty of the situation involving the grass cutting work carried out by the work vehicle 1. The tilt angle information acquired by the tilt angle information acquisition section 24 is transmitted to the calculation section 25 which will be described later.

The calculation section 25 calculates a cost required for the work, based on the work field information, the route information, the electric power information and the tilt angle information. The work field information is transmitted from the work field information acquisition section 21. The route information is transmitted from the route information acquisition section 22. The electric power information is transmitted from the consumed electric power information acquisition section 23. The tilt angle information is transmitted from the tilt angle information acquisition section 24. The calculation section 25 calculates the cost required for the grass cutting work carried out by the work vehicle 1, with using the area of the work field where the grass cutting work was carried out based on the work field information, the traveling route along which the work vehicle traveled based on the route information, the consumed electric power used for the traveling of the work vehicle 1 and driving of the grass mower 53 based on the electric power information, and the difficulty degree of the situation in which the work vehicle 1 carried out the grass cutting work based on the tilt angle information.

In the case of the above-described arrangement in which the work field information includes area information and the route information includes traveling distance information, the calculation section 25 can effect the cost calculation with using not only the work field information including the area information and the route information including the traveling distance information, but also time information indicative of at least one of a work time required for the grass cutting work, a charging time for charging the battery 5 mounted on the work vehicle 1 and a moving time of the work vehicle 1.

With the above-described arrangement, a worker who contracted the grass cutting work can quantitatively calculate the work cost. On the other hand, the client of this grass cutting work can easily verify the reasonableness of the work cost.

Here, as described above, the work vehicle effects autonomous traveling in a work field. On the other hand, an obstacle may be present in the work field. In such case, the work vehicle 1 will travel while carrying out a grass cutting work, with circumventing the obstacle. Thus, the grass cutting work is not always carried out by the shortest route, but involving some wasteful movements. Then, the management system 100 relating to this embodiment further includes a computation section 26 for computing a traveling route that allows cost reduction in the work to be carried out in the work field, based on the work field information, the route information, the electric power information and the tilt angle information. The work field information is transmitted from the work field information acquisition section 21. The route information is transmitted from the route information acquisition section 22. The electric power information is transmitted from the consumed electric power information acquisition section 23. The tilt angle information is transmitted from the tilt angle information acquisition section 24. Then, with using these information, the computation section 26 temporarily computes a traveling route optimal for the work field where the grass cutting work was once carried out. With this, for a traveling route along which the work cutting work was carried out with circumvention of an obstacle, a traveling route that allows reduction of the work cost can be readily derived. The traveling route computed by the computation section 26 will be transmitted to a traveling route storage section 27 to be stored therein.

In case a traveling route computed by the computation section 26 was stored in the traveling route storage section 27, when a next grass cutting work is to be carried out in a field along this traveling route, the traveling control device 10 will carry out this work based on this traveling route. With this, it becomes possible to reduce the cost required for the grass cutting work.

Figure 4:
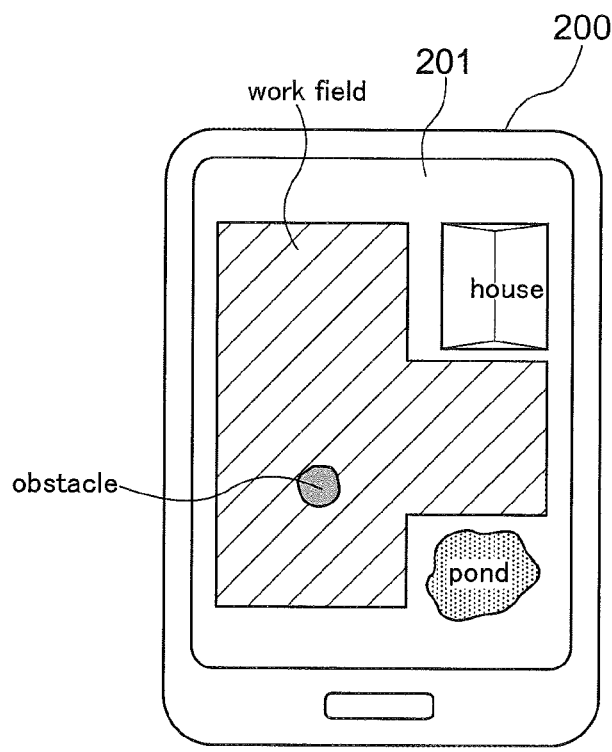
FIG. 4 is a view showing a display surface of a terminal device.

Here, a work field where a grass cutting work is to be carried out can be set by an operation by a user on a map displayed on a display surface 201 of a terminal 200 carried/owned by this user. FIG. 4 shows the terminal 200. Such map displayed on the display surface 201 may use a map stored in the terminal 200 or may utilize map service provided via a network. Preferably, a map including the work field where the cutting work is to be carried out is displayed on the display surface 201 and the work field and/or the obstacle is set by the user's operation on the display surface 201.

Figure 5:
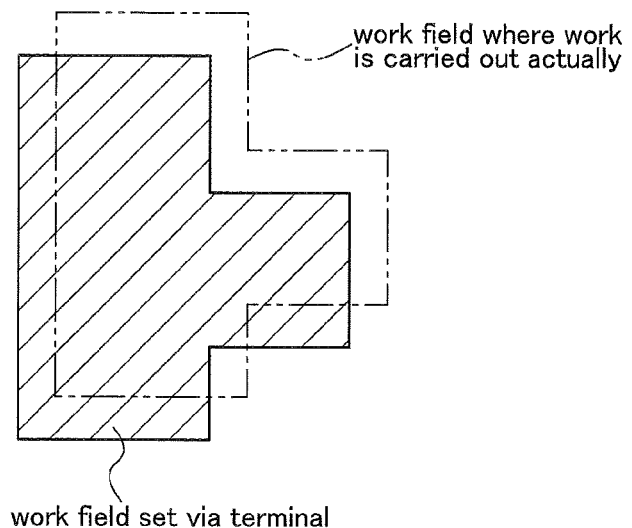
FIG. 5 is a view showing an error of position information.

On the other hand, information indicative of the position (latitude and longitude) of the work field set via using of the terminal 200 by the user will be forwarded to the traveling control device 10 and the work field information acquisition section 21. Then, the traveling control device 10 will carry out the grass cutting work based on the forwarded information indicating the positon of the work field. Also, the work field information acquisition section 21 will carry out the calculation of the cost based on the forwarded information indicating the positon of the work field. Here, in this management system 100, as described above, since the information indicative of the position comprises position information represented by the latitude and longitude using the GPS, the information can contain a predetermined error. In such case as illustrated in FIG. 5, there occurs a difference between the work field set with using the terminal 200 and the work field recognized by the management system 100. As a result, the work field where the grass cutting work is to be actually carried out will deviate from the intended work site.

Figure 6:
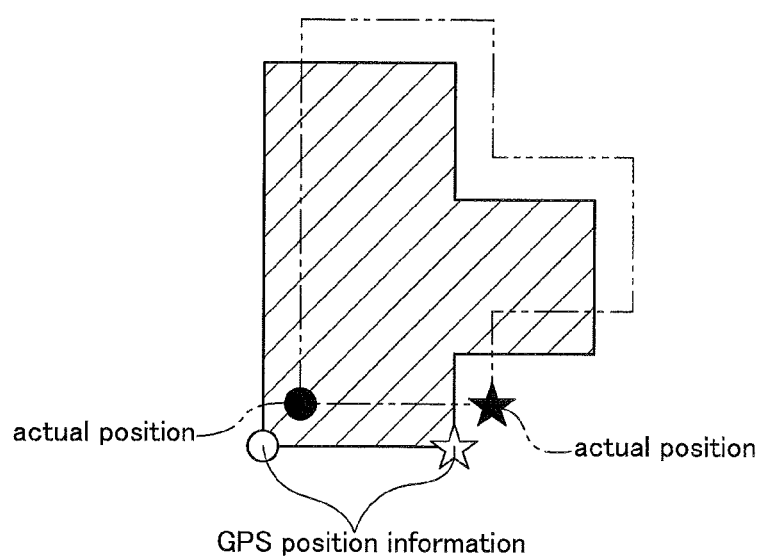
FIG. 6 is a view showing an error of position information

In view of the above, the management system 100 further includes a compensation section 28 for compensating position information indicative of the position of the work field set on the map displayed on the display surface 201 by position information indicative of the actual position of the work field. Here, the position information indicative of the position of the work field set on the map displayed on the display surface 201 is position information using GPS as shown in FIG. 6. The position information indicative of the actual position of the work field is actual position information. Then, the compensation section 28 compensates the position information recognized by the management system 100 such that the GPS position information and the position indicative of the actual position of the work field may be brought into agreement with each other. More particularly, marks (denoted by ● and ★ in FIG. 6) are set at the border of the actual work field and at same positions in the map displayed on the display surface 201 of the terminal 200, marks (denoted by ○ and ☆ in FIG. 6) are set. By associating the mutually corresponding marks (namely, ● and ○ and ★ and ☆) with each other and based on the position relation between the mutually associated marks, the difference between the GPS position information and the position information indicative of the actual position of the work field will be resolved. With this, it becomes possible for the work vehicle 1 to carry out the grass cutting work appropriately on the work field set with using the terminal 200. Further, based on the work field set as described above and the traveling route computed by the computation section 26, it is also possible to compute a time required by the work vehicle 1 for the work.

Other Embodiments

In the foregoing embodiment, it was explained that the work field information includes area information indicative of the area of the work field and the route information includes traveling distance information indicative of the traveling distance traveled by the work vehicle 1 during the work. However, the work field information may be configured without including area information. Similarly, the route information may be configured without including traveling distance information.

In the foregoing embodiment, it was explained that the management system 100 includes the computation section 26 and the traveling route storage section 27. Alternatively, the management system 100 may omit both the computation section 26 and the traveling route storage section 27.

In the foregoing embodiment, it was explained that the work field is set by a user's operation on a map displayed on the display surface 210 of the terminal 200 owned by the user. Instead, the work field can be set by using a map displayed on a display surface included in the management system 100, not on the display surface of the terminal 200 owned by the user. Or, the work field can be set by using some other method as well.

In the foregoing embodiment, it was explained that the management system 100 includes the compensation section 28. Alternatively, the management system 100 may be configured without such compensation section 28.

In the foregoing embodiment, it was explained that the work is a grass (lawn) cutting work. The work maybe any other kind of work, instead.

Industrial Applicability

The present invention is applicable to a management system and a management method for a work vehicle configured to effect a utility work while traveling autonomously.

Description of Reference Marks/Numerals

1: work vehicle
5: battery
21: work field information acquisition section
22: route information acquisition section
23: consumed electric power information acquisition section
24: tilt angle information acquisition section
25: calculation section
26: computation section
27: traveling route storage section
28: compensation section
100: management system
200: terminal
201: display surface

The invention claimed is:
1. A management system for a work vehicle configured to carry out a utility work while traveling autonomously, comprising:

a work field information acquisition section for acquiring work field information indicative of information relating to a work field where the work is to be carried out;
a GPS module for acquiring position information indicative of a position of the vehicle while carrying out the work in the work field;
a route information acquisition section for acquiring route information indicative of a traveling route along which the vehicle has traveled while carrying out the work in the work field;
a consumed electric power information acquisition section for acquiring electric power information indicative of consumed electric power required for the work of an amount of electric power stored in a battery mounted on the work vehicle;
a tilt angle information acquisition section for acquiring tilt angle information indicative of a tilt angle of the work field relative to the horizontal plane; and
a calculation section for calculating a fee cost representing a degree of difficulty of the work specified by the tilt angle information indicative of the tilt angle as required for the work that has been carried out by the work vehicle, based on the work field information, the route information indicative of the traveling route along which the work vehicle traveled to carry out the work, the electric power information indicative of the electric power consumed to carry out the work, and the tilt angle information indicative of the tilt angle of the work field relative to the horizontal plane when the work was carried out by the work vehicle.

2. The management system of claim 1, wherein:
the work field information includes area information indicative of the area of the work field where the work is to be carried out;
the route information includes traveling distance information indicative of a traveling distance for which the work vehicle traveled during the work that has been carried out by the work vehicle;
the calculation section calculates the cost, with using time information indicative of at least one selected from the group consisting of a working time required for the work that has been carried out by the work vehicle, a charging time for charging the battery mounted on the vehicle, and a moving time of the work vehicle, the area information and the traveling distance information.

3. The management system of claim 1, further comprising:
a computation section for computing a traveling route capable of reducing the cost of the work to be carried out in the work field, based on the work field information, the route information, the electric power information and the tilt angle information, relative to a traveling route traveled in the work field to carry out the work;
a traveling route storage section for storing the traveling route computed by the computation section.

4. The management system of claim 1, wherein the work field is set by a user's operation on a map displayed on a display surface of a terminal owned by the user.

5. The management system of claim 4, further comprising a compensation section for compensating position information indicative of a position of a work field set on the map displayed on the display surface by position information indicative of an actual position of the work field.

6. A management method for a work vehicle configured to carry out a utility work while traveling autonomously, comprising the steps of:
acquiring work field information indicative of information relating to a work field where the work is to be carried out;
acquiring, with a GPS module, position information indicative of a position of the vehicle while carrying out the work in the work field;
acquiring route information indicative of a traveling route along which the vehicle has traveled while carrying out the work in the work field;
acquiring electric power information indicative of consumed electric power required for the work of an amount of electric power stored in a battery mounted on the work vehicle;
acquiring tilt angle information indicative of a tilt angle of the work field relative to the horizontal plane; and
calculating a fee cost representing a degree of difficulty of the work specified by the tilt angle information indicative of the tilt angle as required for the work that has been carried out by the work vehicle, based on the work field information, the route information indicative of the traveling route along which the work vehicle traveled to carry out the work, the electric power information indicative of the electric power consumed to carry out the work, and the tilt angle information indicative of the tilt angle of the work field relative to the horizontal plane when the work was carried out by the work vehicle.

7. The management method of claim 6, wherein:
the work field information includes area information indicative of the area of the work field where the work is to be carried out;
the route information includes traveling distance information indicative of a traveling distance for which the work vehicle traveled during the work that has been carried out by the work vehicle;
calculating the cost required for the work includes calculating the cost, with using time information indicative of at least one selected from the group consisting of a working time required for the work that has been carried out by the work vehicle, a charging time for charging the battery mounted on the vehicle, and a moving time of the work vehicle, the area information and the traveling distance information.

8. The management method of claim 6, further comprising the steps of:
computing a traveling route capable of reducing the cost of the work to be carried out in the work field, based on the work field information, the route information, the electric power information and the tilt angle information, relative to a traveling route traveled in the work field to carry out the work;
storing the computed traveling route.

9. The management method of claim 6, wherein the work field is set by a user's operation on a map displayed on a display surface of a terminal owned by the user.

10. The management method of claim 9, further comprising the step of compensating position information indicative of a position of a work field set on the map displayed on the display surface by position information indicative of an actual position of the work field.

* * * * *